United States Patent [19]

Takaku et al.

[11] Patent Number: 5,434,204
[45] Date of Patent: Jul. 18, 1995

[54] COLORED STYRENIC RESIN COMPOSITION

[75] Inventors: Masato Takaku; Mune Iwamoto, both of Takaishi; Masaru Honma, Nabari; Atsushi Hashimoto, Takaishi, all of Japan

[73] Assignee: Mitsui Toatsu Chemicals, Incorporated, Tokyo, Japan

[21] Appl. No.: 960,766

[22] Filed: Oct. 14, 1992

[30] Foreign Application Priority Data

Oct. 18, 1991 [JP] Japan .................. 3-270780

[51] Int. Cl.$^6$ .................................................. C08K 5/00
[52] U.S. Cl. ........................................................ 524/178
[58] Field of Search ........................................... 524/178

[56] References Cited

U.S. PATENT DOCUMENTS

| | | | |
|---|---|---|---|
| 2,798,105 | 4/1957 | Tomka et al. | 260/45.75 |
| 3,635,883 | 1/1972 | Stamm | 524/178 |
| 3,907,932 | 9/1975 | Kennedy et al. | 260/881 |
| 4,021,407 | 5/1977 | Gough et al. | 524/178 |
| 4,085,077 | 4/1978 | Dworkin et al. | 260/23 |
| 4,089,912 | 5/1978 | Levek et al. | 524/178 |

FOREIGN PATENT DOCUMENTS 63-86743 4/1988 Japan .
2-88659 3/1990 Japan .

*Primary Examiner*—Peter D. Mulcahy
*Attorney, Agent, or Firm*—Burns, Doane, Swecker & Mathis

[57] ABSTRACT

A colored styrenic resin composition comprises 100 parts by weight of a styrenic resin, 0.1 to 5 parts by weight of titanium oxide and 0.05 to 2.5 parts by weight of an organo-tin compound and in which the amount of the organo-tin compound is not less than 10% by weight on the basis of the amount of the titanium oxide. The resin composition ensures the production of injection-molded articles free of black streaks and, therefore, the articles formed from the resin composition of the invention have high commercial value. The colored styrenic resin composition is useful as a material for the production of housings of, for example, a variety of electric appliances and office machinery and equipment as well as miscellaneous goods.

5 Claims, No Drawings

COLORED STYRENIC RESIN COMPOSITION

BACKGROUND OF THE INVENTION (a) Field of the Invention

The present invention relates to a colored styrenic resin composition which is useful as a material for the production of housings of, for example, a variety of electric appliances and office machinery and equipment as well as miscellaneous goods.

(b) Description of the Prior Art

Styrenic resins have widely been used as materials for forming various products because of the well-balanced processing properties, dimensional stability and mechanical strength thereof. In particular, they have been used for making housings of, for example, a variety of electric appliances and office machinery and equipment as well as external parts for miscellaneous goods. They are in general used in colored or pigmented conditions from the viewpoint of design. In the coloration of styrene resins used in these applications, titanium oxide is often used and the coloration thereof is usually carried out by kneading the resin with a mixture comprising titanium oxide and a dispersant such as a metal salt of a fatty acid for uniformly dispersing the titanium oxide in the resin. When styrenic resins colored with titanium oxide are injection-molded, however, the injection-molded product sometimes has a stripe-like pattern even though black pigment is not used. This black stripe-like pattern is in general called a "black streak".

The formation of the foregoing black streaks greatly impairs the commercial value of the product. For this reason, many attempts to eliminate this problem have been made. For instance, Japanese Unexamined Patent Publication (hereinafter referred to as "J.P. KOKAI") No. Sho 63-86743 discloses a method for solving the problem which comprises adding, to a styrenic resin composition containing titanium oxide and a metal salt of a fatty acid, 9,10-dihydro-9-oxa-10-phosphaphenanthrene-10-oxide, distearylpentaerythritol diphosphite, tetrakis(2,4-di-t-butylphenyl)-4,4'-biphenylene diphosphite or boron trioxide and J.P. KOKAI No. Hei 2-88659 discloses the use of alkylene-bis-fatty acid amide or a zinc salt of a fatty acid as a dispersant for the coloring agent. However, both of these methods are insufficient for completely preventing the formation of black streaks.

The cause for the formation of black streaks has not yet been clearly elucidated, but it would be assumed that the problem of the formation of black streaks is caused by titanium oxide per se since the black streaks are always formed when the resin composition comprises titanium oxide as a coloring agent irrespective of the presence of a dispersant. In other words, it would be recognized that the black streaks are formed for the following reason. The titanium oxide is dispersed in a molten resin in the form of particles, the titanium oxide particles are plated-out from the molten resin during the injection molding thereof and the particles scrape off the surface of the cylinder and/or screw of the molding machine.

SUMMARY OF THE INVENTION

The object of the present invention is to provide a means for solving the problem of the forgoing undesirable phenomenon, i.e., the formation of so-called "black streak" observed when colored articles are formed by injection-molding a colored styrenic resin composition which comprises titanium oxide as a coloring agent.

The inventors of this invention have conducted intensive studies to accomplish the foregoing object, have found that the object can be effectively achieved by addition of a specific compound to a styrenic resin composition containing titanium oxide as a coloring agent and thus have completed the present invention on the basis of this finding.

According to the present invention, there is provided a colored styrenic resin composition which comprises 100 parts by weight of a styrenic resin, 0.1 to 5 parts by weight of titanium oxide and 0.05 to 2.5 parts by weight of an organo-tin compound and in which the amount of the organo-tin compound is not less than 10% by weight on the basis of the amount of the titanium oxide used.

DESCRIPTION OF THE PREFERRED EMBODIMENTS

As the styrenic resins usable in the present invention, there may be mentioned, for instance, homopolymers of styrene monomers (GPPS resins), copolymers of styrene monomers with other monomers copolymerizable therewith such as styrene/acrylonitrile copolymer resins (AS resins), polymers obtained by grafting styrene monomers or styrene monomers and other monomers copolymerizable therewith such as acrylonitrile on rubber components, and/or by accluding rubber components in a matrix of these polymer such as high impact polystyrene resins (HIPS resins) and acrylonitrile/styrene/butadiene copolymer resins (ABS resins). It is also preferred to use these styrenic resins in which a part or whole of the styrene moieties thereof are substituted with moieties derived from aromatic vinyl compounds such as $\alpha$-methylstyrene, p-methylstyrene, vinyl toluene and/or p-tert-butylstyrene as well as those in which a part or whole of the acrylonitrile moieties thereof are substituted with moieties derived from cyanylated vinyl compounds and those obtained by copolymerizing the foregoing monomers in the presence of other copolymerizable monomers such as acrylic acid, methacrylic acid and/or maleic anhydride.

Titanium oxides used in the present invention may be those commonly used in this field and the average particle size thereof may be in the range of from 0.01 to 0.5$\mu$. The crystalline structure thereof may be rutile and anatase type be. The surface of titanium oxide is not necessarily be treated, but preferably is treated with, for instance, aluminum oxide in advance. The amount of titanium oxide to be incorporated into the resin composition in general ranges from 0.1 to 5 parts by weight per 100 parts by weight of the resin used. This is because if it is less than the lower limit, the resulting resin composition is insufficiently pigmented, while if it exceeds the upper limit, the strength of the styrenic resin is often impaired.

The organo-tin compound used in the resin composition according to the present invention serves to inhibit the separation of titanium oxide particles from the molten resin component during the injection-molding operation of the composition unlike the conventional dispersants for titanium oxide and thus the formation of the black streaks can certainly be inhibited. In the resin composition of the present invention, the organo-tin compound simultaneously serves as a dispersant for titanium oxide.

Examples of organo-tin compounds usable in the present invention include dialkyl tin carboxylates such as dibutyl tin dilaurate and dibutyl tin maleate with dioctyl tin dimaleate and dibutyl tin maleate being particularly preferred. The amount of the organo-tin compound ranges from 0.05 to 2.5 parts by weight and preferably 0.1 to 1.5 part by weight per 100 parts by weight of the styrenic resin component used. At the same time, the amount of the organo-tin compound should be adjusted to not less than 10% by weight of the amount of the titanium oxide used. This is because, if it is less than 0.05 part by weight per 100 parts by weight of the resin component or less than 10% by weight on the basis of the amount of titanium oxide, black streaks are often formed on the surface of injection-molded articles, while if the amount of the organo-tin compound exceeds 2.5 parts by weight, the organo-tin compound volatilizes and hence becomes a cause of clogging of ventilation parts of a mold.

The resin composition of the present invention is desirably free of organic halogen atom-containing compounds. The term "organic halogen atom-containing compounds" herein means flame retarders to be incorporated into the resin such as tetrabromobisphenol A and derivatives thereof, decabromodiphenyl ether, hexabromocyclododecane and polycarbonate oligomers which include the moieties derived from tetrabromobisphenol A; and resin components such as polyvinyl chloride. These organic halogen atom-containing compounds show low thermal stability and this, in turn, leads to the decomposition of these compounds during fabrication processes and the reduction of the black streak-inhibitory effect of the organo-tin compound through the reaction therebetween.

The resin composition according to the present invention may be prepared in any manner. For instance, it can be prepared by mixing titanium oxide and an organo-tin compound, in advance, in a Henschel mixer, a tumbling mixer or a ball mill, then mixing the resulting mixture with a resin in a Henschel mixer or a tumbling mixer and thereafter forming the resulting mixture into pellets through an extruder or a kneader; or by mixing, in advance, a resin component and an organo-tin compound according to the foregoing manner, then pelletizing the mixture, mixing the pellets with titanium oxide in the foregoing manner and then forming the mixture into pellets; or by mixing a resin component, titanium oxide and an organo-tin compound at a time in the foregoing manner and then forming the resulting mixture into pellets.

The styrenic resin composition of the present invention may optionally include additives other than titanium oxide such as coloring agents, antistatic agents, antioxidants, plasticizers and/or ultraviolet absorbers.

The present invention will hereinafter be explained in more detail with reference to the following working Examples and Comparative Examples, but the present invention is by no means limited to these specific Examples.

Examples 1 to 9 and Comparative Examples i to viii

Titanium oxide and organo-tin compounds were previously mixed in a tumbling mixer so that each mixture satisfied the formulation listed in the following Table 1 and then the resulting mixture, a resin and a dispersant were formed into pellets using an extruder at a cylinder temperature of 220° C. The resulting pellets were formed into 100 flat plates having a size of 50×150 mm at a cylinder temperature of 240° C., a screw back pressure of 20 kg/cm$^2$, a screw-revolution of 100 rpm and a mold temperature of 50° C. using an injection molding machine: IS-80 EPN available from Toshiba Machine Co., Ltd., followed by determining the number of plates on which black streaks were formed. The results obtained are listed in Table 1. The formation of black streaks were not observed on all of the plates formed from the resin compositions of the present invention, while a large number of black streaks were formed on the plates formed from the resin compositions of Comparative Examples tested.

As has been explained above in detail, the resin composition of the present invention ensures the production of injection-molded articles free of black streaks and, therefore, the articles formed from the resin composition of the invention have high commercial value.

TABLE 1

| Ex. No. | Styrenic Resins Used Kind | Amount[1] | Amount[1] of TiO$_2$ | Organo-tin Compound Kind | Amount[1] | Dispersant Kind | Amount[1] | No. of Plate Carrying Black Streak (number) |
|---|---|---|---|---|---|---|---|---|
| i | ABS resin | 100 | 0.1 | none | — | none | — | 34 |
| ii | ABS resin | 100 | 1.0 | none | — | none | — | 68 |
| iii | ABS resin | 100 | 3.0 | none | — | none | — | 100 |
| iv | ABS resin | 100 | 5.0 | none | — | none | — | 100 |
| v | ABS resin | 100 | 0.1 | dibutyl tin maleate | 0.01 | none | — | 18 |
| 1 | ABS resin | 100 | 0.1 | dibutyl tin maleate | 0.05 | none | — | 0 |
| vi | ABS resin | 100 | 1.0 | dibutyl tin maleate | 0.03 | none | — | 32 |
| 2 | ABS resin | 100 | 1.0 | dibutyl tin maleate | 0.15 | none | — | 0 |
| 3 | ABS resin | 100 | 1.0 | dibutyl tin maleate | 0.3 | none | — | 0 |
| 4 | ABS resin | 100 | 3.0 | dibutyl tin maleate | 1.0 | none | — | 0 |
| 5 | ABS resin | 100 | 5.0 | dibutyl tin maleate | 2.0 | none | — | 0 |
| 6 | ABS resin | 100 | 1.0 | dibutyl tin dilaurate | 0.3 | none | — | 0 |
| 7 | ABS resin | 100 | 3.0 | dibutyl tin dilaurate | 1.0 | none | — | 0 |
| vii | AS resin | 100 | 3.0 | none | — | none | — | 100 |
| 8 | AS resin | 100 | 3.0 | dibutyl tin maleate | 1.0 | none | — | 0 |
| viii | ABS resin | 100 | 3.0 | none | — | ZnSt[2] | 0.5 | 100 |
| 9 | ABS resin | 100 | 3.0 | dibutyl tin maleate | 1.0 | ZnSt | 0.5 | 0 |

[1]part by weight.
[2]ZnSt means zinc stearate.

We claim:

1. A colored styrenic resin composition free of organic halogen atom-containing compounds and comprising 100 parts by weight of a styrenic resin, 0.1 to 5 parts by weight of titanium oxide and 0.05 to 2.5 parts by weight of dialkyl tin carboxylate and in which the amount of the dialkyl tin carboxylate is not less than 10% by weight on the basis of the amount of the titanium oxide.

2. The styrenic resin composition according to claim 1 wherein the styrenic resin is an acrylonitrile/styrene/butadiene copolymer resin.

3. The styrenic resin composition according to claim 1 wherein the dialkyl tin carboxylate is selected from the group consisting of dibutyl tin dilaurate, dibutyl tin maleate and dioctyl tin dimaleate.

4. The styrenic resin composition of claim 1 wherein the dialkyl tin carboxylate is dibutyl tin maleate.

5. The styrenic resin composition of claim 1 wherein the dialkyl tin carboxylate is in an amount of 0.1 to 1.5 part by weight.

* * * * *